United States Patent
Reichle

(10) Patent No.: US 7,543,372 B2
(45) Date of Patent: Jun. 9, 2009

(54) METHOD OF ELECTRICALLY CONNECTING CONDUCTIVE RAILROAD ATTACHMENT

(75) Inventor: David L. Reichle, Littleton, CO (US)

(73) Assignee: Fastrax Industries, Inc., Littleton, CO (US)

( * ) Notice: Subject to any disclaimer, the term of this patent is extended or adjusted under 35 U.S.C. 154(b) by 675 days.

(21) Appl. No.: 11/186,217

(22) Filed: Jul. 21, 2005

(65) Prior Publication Data

US 2006/0032933 A1 Feb. 16, 2006

Related U.S. Application Data

(60) Provisional application No. 60/600,182, filed on Aug. 10, 2004.

(51) Int. Cl.
*H01R 43/00* (2006.01)
(52) U.S. Cl. .............................. 29/825; 29/841; 29/842; 29/843
(58) Field of Classification Search .................. 29/825, 29/841, 842, 843
See application file for complete search history.

(56) References Cited

U.S. PATENT DOCUMENTS 2,022,544 A * 11/1935 Huber ..................... 238/14.12
2,109,791 A * 3/1938 Carlson ................... 238/14.12
3,624,271 A * 11/1971 Wittman ................... 174/94 R
5,503,331 A * 4/1996 Uramson et al. ............. 238/152

OTHER PUBLICATIONS

Berthoud-Thomas three-phase electric road,, Electrical Review, vol. XLVIII, May 5, 1906, pp. 677-680.*

* cited by examiner

*Primary Examiner*—C. J Arbes
(74) *Attorney, Agent, or Firm*—Marsh Fischmann & Breyfogle LLP

(57) ABSTRACT

Disclosed is a method for forming electrical interconnections between railroad track components and signal conductors/lines. In one arrangement, an electrically conductive adhesive is utilized to electrically interconnect a signal conductor to a railroad track component. In another arrangement, a clamp is utilized in conjunction with the electrically conductive adhesive that forms the electrical interconnection. The clamp maintains the signal conductor in direct contact with the surface of the railroad track component while the electrically conductive adhesive cures. In these arrangements, the use of the electrically conductive adhesive allows for making an electrical connection with a railroad component without penetrating the structure of that component. In a further arrangement, a hollow tubular connector is utilized to electrically connect two signal conductors associated with railroad track components. An interior of the tubular connector is at least partially filled with an electrically conductive adhesive prior to inserting the ends of the signal conductors therein.

17 Claims, 10 Drawing Sheets

METHOD OF ELECTRICALLY CONNECTING CONDUCTIVE RAILROAD ATTACHMENT

CROSS REFERENCE TO RELATED APPLICATIONS

This application claims priority under 35 U.S.C. 119 to U.S. Provisional Application No. 60/600,182 entitled: "Non-invasive Railroad Attachment Mechanism," having a filing date of Aug. 10, 2004.

FIELD OF THE INVENTION

The present invention relates to a system and method for forming an electrical connection between a railroad track rail and any electrical conductor, for example signal lines, wires or cables. Further, the system is operative to form such an electrical connection for the conduction of any voltage and/or current.

BACKGROUND OF THE INVENTION

In typical railroad systems, a length of many miles of track may be divided into a plurality of successive adjacent blocks that may be further subdivided into cut circuits (collectively track sections) for control, monitoring, heating and/or maintenance purposes. Each track section forms a track circuit wherein the track rails are utilized to carry electrical signals. In some cases, the track rails in each track section are electrically insulated from the track rails of adjacent track sections such that each circuit may be utilized individually for control and monitoring purposes.

Monitoring the track circuits provide means for detecting the presence or absence of a railroad vehicle, equipment and/or any other foreign apparatus that activates or otherwise interacts with a given track section. Information obtained from such monitoring may be used for traffic control purposes thereby allowing trains to operate at safe speeds and/or to identify train locations as the trains pass from one track section to another. For instance, it is customary to detect the presence of a railroad vehicle in a particular track section by detecting the presence of a short circuit or other variation in a signal being monitored through the rails of the track section. That is, when a railroad vehicle enters a particular track section, the wheels and axle of the vehicle provide a short circuit between the rails of that track section or otherwise alter the track circuit in the track section (e.g., produce a change in impedance). Based upon detection of such a short circuit or signal variation, one or more control signals may be generated to operate, for example, track switches, railroad crossing gates, communications systems, maintenance equipment, etc. The track rails, in addition to carrying signals utilized for train detection and control, may also carry other signals (e.g., at different frequencies). Such signals may include, without limitation, train-to-wayside, wayside-to-train and train-to-train communications.

Irrespective of the type or purpose of the signals passing through the track sections, it is generally necessary to electrically interconnect one or more electrical conductors, wires or cables (hereafter signal lines) to the track rail to provide, receive and/or transfer such signals. One current method for interconnecting signal lines to track rails utilizes an exothermic weld to interconnect a cable to the track rail. That is, a first end of a cable may be spot welded directly onto the track rail to form what is termed a "pig tail." A second end of the cable may then be attached to a signal line that may in turn be interconnected to, for example, switch boxes, another track section, etc. Typically, the second end of the cable is butt-coupled to the signal line using a crimp-fit connector. Another method for interconnecting signal lines to track rails entails the use of a spring clamp that wraps around the foot of a track rail to provide a contact interface with the rail.

SUMMARY OF THE INVENTION

One objective of the present invention is to provide an improved system and method for electrically coupling an electrical conductor (e.g., a signal line) to a track rail.

The inventor of the present invention has recognized that current methods utilized to make electrical interconnections to track rails, including electrically connecting separate track sections together and/or electrically interconnecting track rails to signaling boxes, track switches, railroad crossing gates, communications systems, adjacent track sections, etc. present certain challenges. Specifically, it has been recognized that electrical signals typically carried in track rails for signaling purposes are of such low amplitude and/or frequency that the resistance provided by current electrical interconnections between signal lines and track rails may affect signal transfer. For instance, in the case where a short cable or "pigtail cable" is welded to a track rail to form an electrical junction with the track rail, the inventor has recognized that the crimp-fit connector utilized to connect the pigtail cable to a signal line provides significant resistance to passage of electrical current. This resistance can be caused by a loose or corroded crimp connector (e.g., a ferrule connector). In the later regard, electro-galvanic corrosion between the connector and the pigtail cable and/or the signal line may result in a deterioration of the electrical connection over time. In any case, the presence of such resistance and/or deterioration of the electrical connection can result in intermittent electrical connections that can require frequent maintenance.

Further, the inventor has also recognized that the heat of welding can result in physical changes to the metal of the track rail itself. Particularly, it has been determined that martensite may be formed at the connection between the pigtail cable and the track rail. This martensite may form when, at elevated temperatures associated with welding, carbon within the track rail migrates to the weld area. The presence of the martensite can result in an increased electrical resistance to signals traveling through the weld area. Furthermore, if the weld area is not carefully located on the track rail, the presence of Martensite can result in an area of stress concentration within the track rail. Over time, this area may weaken and/or result in the fracture of the track rail. In the case of contact clamps, the inventor has recognized that due to corrosion on the surface of the track rail as well as electro-galvanic action between the rail and the clamp, electrical contact between the clamp and the rail is often poor and is subject to deterioration over time.

Accordingly, the inventor has recognized it would be desirable to avoid the use of welding and contact clamps to electrically interconnect electrical signal conductors (e.g., signal lines) to track rails. As will be appreciated, this may eliminate electrical resistance caused by the weld area and may eliminate poor electrical connection achieved by contact clamps.

According to one aspect of the present invention, a system and method for directly adhering a signal conductor to a surface of a track rail using an electrically conductive adhesive is provided. Specifically, the method includes preparing a contact area on the surface of a track rail. An electrically conductive adhesive is applied to the contact area and/or to an exposed conductive portion of a signal conductor. The exposed conductive portion of the signal conductor is contacted to the contact area such that the electrically conductive adhesive may electrically interconnect the signal conductor and the track rail. Preferably, the electrically conductive portion of the signal conductor is maintained in a fixed positional relationship with the contact area while the electrically conductive adhesive at least partially cures.

Various refinements exist of the features noted in relation to the first aspect of the present invention. Further features may also be incorporated into the first aspect of the present invention. These refinements and additional features may exist individually or in any combination. For example, the signal conductor may be adhesively attached to any appropriate surface of the track rail including the sides of the railhead (e.g., gauge and/or field side), the top/bottoms surfaces of the rail foot, the rail web and/or the edge/flange surfaces of the rail foot. Furthermore, the signal conductor may be attached to other railroad components, including without limitation, running or moving rails (e.g., switching rails), frog bodies or their associated rails.

Any conductive adhesive may be utilized to adhere the signal wire to the track rail. What is important is that the selected adhesive provides adequate bonding strength over a desired temperature range for a given application. A temperature range may be specific to a given geographical area. However, for most railroad applications, a temperature rage between about −40° F. and about 150° F. (i.e., rail temperature) is sufficient. The conductive adhesive also preferably has a large range of permissible curing temperatures such that maintenance operations may be performed in most weather conditions. For example, a curing range with a lower limit of around freezing and an upper limit in excess of 150° F. will permit making electrical connections in most conditions. Furthermore, the method may include applying heat to the track rail such that the temperature of the track rail may be elevated into a desired temperature range for bonding purposes.

The selected adhesive should also provide an electrical conductivity that provides minimal resistance between the signal conductor and the track rail. To achieve a desired electrical conductivity, the pre-cured adhesive typically includes electrically conductive filler disposed within a resin, which may be of any appropriate type. In this regard, such resins may be selected from thermosetting resins that may include two-part mixtures (e.g., a resin and a hardener). Such two-part mixtures may be provided in pre-measured containers. Further, the electrically conductive filler may be premixed within such a pre-measured container of the resin and/or hardener. Examples of thermosetting resins include, without limitation, epoxies, polyesters, phenolics, vinyl esters, silicones, and/or polyimides. Epoxies are most commonly utilized. In addition to thermosetting resins, the adhesive may, in some instances, utilize a thermoplastic resin such as polysulfone, polyamide, polyetheretherketone (i.e., PEEK), etc. As will be appreciated, adhesives made from such thermoplastic materials may have similar strength and stiffness characteristics of thermosetting resins while exhibiting higher toughness. However, utilization of thermoplastic resins may require high temperature application. What is important is that the selected resins (i.e., thermosetting or thermoplastic) have the ability to mix with the electrically conductive filler and form a secure electrical connection with the track rail. Furthermore, it is desirable that the conductive adhesive, upon curing, inhibit deterioration of the connection between the signal wire and the track rail. That is, is preferable that the conductive adhesives prohibit and/or resist corrosion including electro-galvanic corrosion between adhesively connected components.

The electrically conductive filler within the pre-cured adhesive allows the cured adhesive to be electrically conductive. That is, electrically conductive filler may be dispersed throughout the matrix of an adhesive resin and contact between individual elements of the filler in the matrix provides for an electrically conductive path through the cured adhesive. Any electrically conducted filler may be utilized within the resin. A list of such conductive fillers includes, without limitation: silver, nickel, graphite, carbon, copper and aluminum and any combination thereof. The size and shape of such filler may be selected to achieve a desired conductivity and or adhesive strength. For example, the electrically conductive filler may be formed as metal filings, metallic spheres, or, as filaments. Inclusion of filaments (e.g., carbon fibers, graphite fibers, and/or metallic wires) within the resin material may also provide additional reinforcement for the adhesive. In this regard, the shear strength of the adhesive may increase with the inclusion of such filaments. What is important is that the electrically conductive filler create an electrically conductive path through the cured adhesive.

Preparing a contact area on the surface of the track rail may entail cleaning an area such that effective electrical contact may be formed with the track rail. For instance, such preparation may entail the removal of, for example, rust and/or other surface imperfections/oxidations. Such preparation may be performed by chemically treating or abrading the surface of the track rail. Further, the prepared area may then be cleansed (for example, utilizing alcohol, etc.) to remove any remaining particulates. Once so prepared, the signal conductor may be directly adhered to the track rail utilizing the conductive adhesive.

According to another aspect of the invention, a system and method for directly adhering a signal conductor to a surface of a track rail is provided that further incorporates the use of a mechanical anchor or clamp to maintain a signal conductor (or other electrical conductor) in a fixed positional relationship with a railroad track component. The method includes preparing a contact area of a railroad track component, attaching a mechanical anchor to the railroad track component and compressing an electrically conductive portion of a signal conductor between a portion of the anchor and the track rail. An electrically conductive adhesive is applied to the contact area an/or the signal conductor.

As will be appreciated, the mechanical anchor maintains the signal conductor in fixed positional relationship with the track rail while the electrically conductive adhesive cures. This allows the conductive adhesive to cure without additional labor requirements. Further, the mechanical anchor may permit the track rail to be utilized by railroad vehicles while the conductive adhesive cures.

Any clamp or anchor may be utilized to hold the signal conductor in a fixed positional relationship with the track rail while the electrically conductive adhesive cures. As will be appreciated, use of such an anchor may allow for use of slow curing adhesives that provide desired material characteristics. Such clamps or anchors may in some instances be left in place after the electrically conductive adhesive has cured. Alternatively, the anchors may be removed. Preferably, such clamps are non-invasive clamps that do not penetrate the structural integrity of the track rail. Examples of such clamps are provided in co-filed U.S. patent application Ser. No. 11/186,228 entitled "Non-Invasive Railroad Attachment Mechanism" the contents of which are incorporated herein by reference.

Additional objectives and advantages of the present invention will be apparent upon consideration of the present disclosure.

BRIEF DESCRIPTION OF THE DRAWINGS

For a more complete understanding of the present invention and further advantages thereof, reference is now made to the following Detailed Description taken in conjunction with the drawings in which.

DETAILED DESCRIPTION

The present invention is directed to the use of an electrically conductive adhesive to connect a signal conductor to a railroad track rail. Though discussed herein in relation to interconnecting a switching box to track rail via a signal conductor, it will be appreciated that the invention is applicable to the electrical interconnection of any electrical conductor to a track rail for any purpose.

Figure 1:
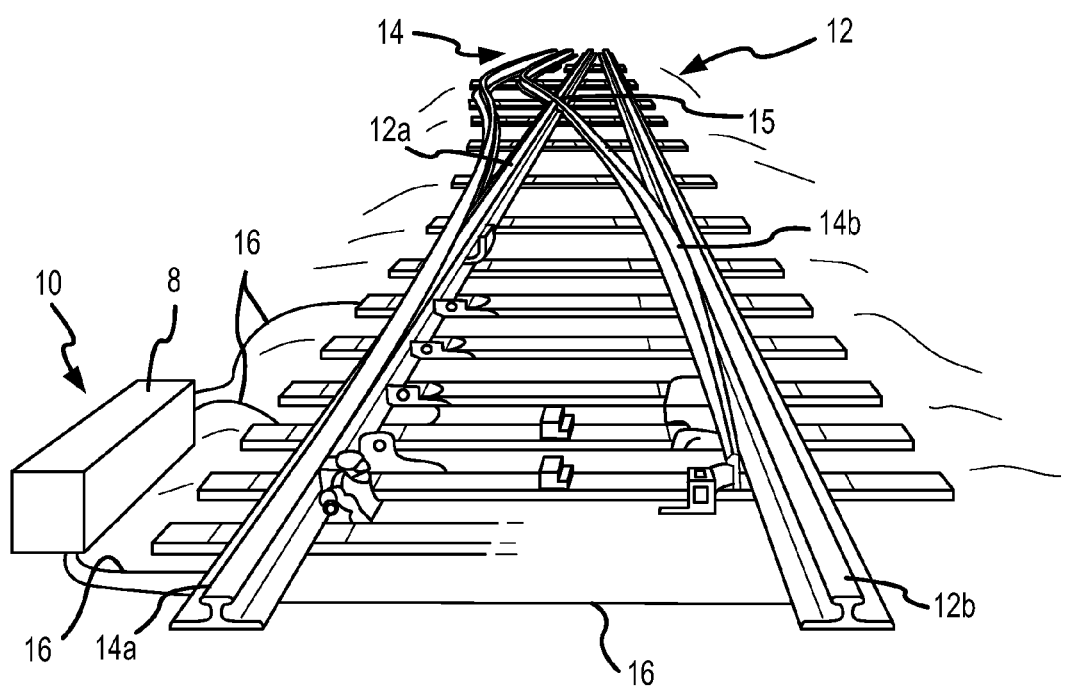
FIG. 1 shows a section of railroad track rails.

Referring to FIG. 1, a section of railroad track is generally identified by the reference numeral 10. As shown, the section of railroad track 10 includes a switching mechanism to switch trains between first and second tracks 12, 14. Each set of tracks 12, 14 includes two of track rails. As shown, the first track 12 includes a switching rail 12a and a stationary or stock rail 12b (also known as a running rail). Likewise, the second track 14 includes a stock rail 14a and a switching rail 14b. For purposes of controlling traffic, each track rail 12, 14 is electrically interconnected to a signal providing and monitoring system 8 that is located in proximity to the rail connection location The signal providing and monitoring system 8 is operative to redirect trains from the first track 12 to the second track 14 by mechanically moving the switching rails 12a and 14b relative to the stock rails 12b and 14a, respectively. Generally, a switch mechanism is mechanically interconnected to the switching rails 12a and 14b in order to move them in unison relative to the stock rails 12b and 14a at the connection point. The switching mechanism is typically attached to the rails with an electrically isolated linkage. In the case of switching rail 14b, mechanical movement may occur on both ends. That is, a first end of the switching rail 14b may be moved relative to the stock rail 12b and a second end of the switching rail 14b may be moved relative to a distal portion of switching rail 12a, where these rails cross. This point is sometimes referred to as a railroad "frog" 15. The frog 15 may in some instances be a passive spring actuated system that utilizes the pressure from the wheels of a passing railroad vehicle to permit railroad vehicle wheels to access the correct track. Alternatively, the frog 15 may be mechanically actuated/moved to permit railroad vehicle wheels to access the correct track. To effectuate switching of the switching rails and/or the railroad frog, the monitoring system 8 may detect the presence of approaching railroad vehicles and/or receive signals from approaching vehicles.

In a common arrangement, the signal providing and monitoring system 8 utilizes the track rails 12a, 12b and 14a, 14b to detect the presence and, generally, the speed of approaching railroad vehicles and/or to receive signals from the approaching railroad vehicles. In this regard, each set of track rails 12, 14 form an electric circuit (i.e., track circuit) that is interconnected to the monitoring system 8 by one or more signal lines 16. In one arrangement, a resulting electrical circuit may be short circuited when the wheels and axle of an approaching railroad vehicle interconnects the track rails 12a, 12b or 14a, 14b. In another arrangement, the impedance of a signal changes due to the presence of an approaching railroad vehicle. The length of each track circuit depends upon various circumstances including the distance over which signals may be effectively sent, received and/or detected. Normally, such a track circuit will fall into the range of several feet to a few miles. To define such track circuits, the track rails may be divided into adjacent sections by providing insulated joints. Such insulated joints allow for electrically isolating adjacent sections to track rail from one another.

Electrically interconnecting any device to a track rail generally requires interconnecting an electrical conductor (hereafter signal line) to the structure of a given track rail 12, 14. Previously this has entailed welding a pigtail to the surface of the track rail and interconnecting a signal line to the pigtail or bolting a signal line directly to the surface of the track rail. The pig tail method can provide significant electrical resistance to signals traveling through the track rail whereas the bolting method can result in galvanic action between dissimilar metals (e.g., steel and copper), which may also results in increased resistance over time. Such resistance may be a limiting factor in the length of the tack circuits and/or may result in ineffective signal transfer. Accordingly, the present invention is directed to electrically interconnecting a signal line 16 to surface of the track rail utilizing an electrically conductive adhesive.

Figure 2:
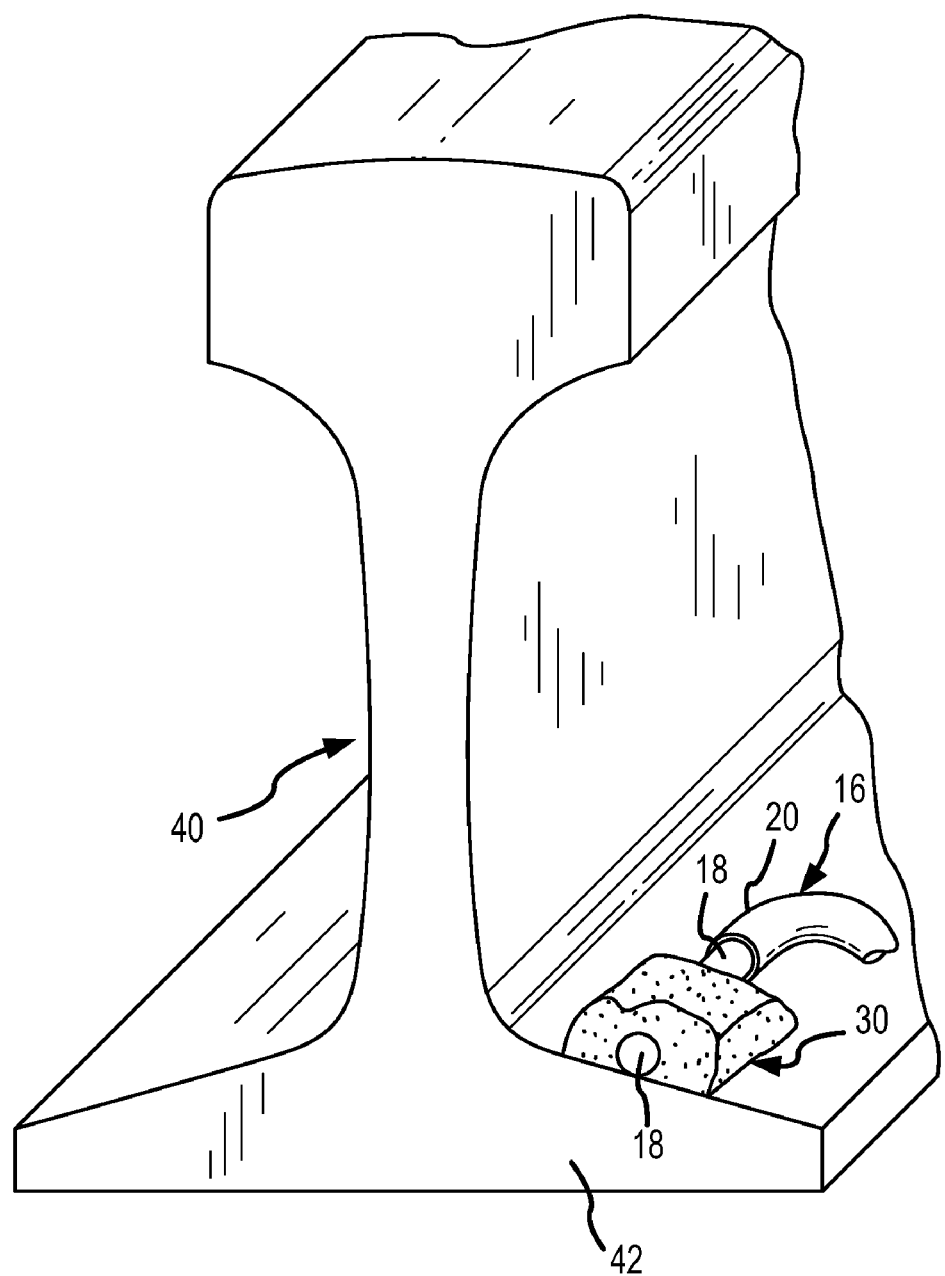
FIG. 2 shows a perspective cross sectional view of an interconnection between a track rail and a signal conductor.

FIG. 2 shows a cross-sectional view of one embodiment of the present invention wherein a signal line 16 is adhesively attached to the surface of an exemplary track rail 40. More specifically, the signal line is adhered to the top surface of the foot 42 of the track rail 40 utilizing an electrically conductive adhesive 30. As will be appreciated, the signal line 16 will typically include an electrically conductive core 18 (e.g., braided copper wire) and a nonconductive coating 20 or sheath. In order to adhesively attach the signal line 16 to the track rail 40 a portion of the nonconductive coating 20 is removed from the signal line 16 to expose a portion of the electrically conductive core 18.

Electrically conductive adhesive may be applied directly to the exposed portion of the conductive core 18 of the signal line 16 and/or the conductive core 18 may be pressed into a bead of electrically conductive adhesive 30 disposed on the top surface of the foot 42 of the track rail 40. Alternatively, the electrically conductive adhesive may be applied to the conductive core 18 and track rail 40 after the signal line 16 is clamped to the surface of the track rail, as will be discussed herein. The electrically conductive adhesive 30 creates an electrical connection between the track rail 40 and the core 18 of the signal line 16.

Preferably, the electrically conductive adhesive 30 will fully encapsulated the exposed core of the signal line 16. As illustrated, a portion of the core 18 is shown as being exposed for illustrative purposes. This encapsulation will generally prevent any galvanic action between the dissimilar materials of the signal line 16 and the track rail 40. In this regard, the electrical resistance between these members will not increase over time. In any case, it is desirable that the signal line 16 be immobilized while the electrically conductive adhesive 30 cures (i.e., hardens). If necessary, the electrically conductive adhesive may be pooled about the exposed conductive core/track rail interface to fully encapsulate the exposed conductive core 18.

To enhance electrical conduct between the core 18 of the signal line 16 and the track rail 40, the surface of the track rail 40 may require preparation. This preparation may entail the removal of, for example, rust, oxidation, factory surface coatings and/or other imperfections on the track rail surface. Such preparation may entail chemically treating, or abrading the surface of the track rail 40. Preferably, such abrasion does not affect the structural integrity of the track rail 40 and may utilize sand paper, emory paper, steel wool and/or other abrasion techniques.

Any electrically conductive adhesive may be utilized to adhere the signal line 16 to the track rail 40 so long as the selected adhesive provides adequate bonding strength over a desired temperature range for a given application. For railroad applications, an applicable temperature range may vary between about −40° F. and about +150° F. Further, the selected adhesive should provide adequate electrical conductive properties. In this regard, the adhesive generally includes a resin and electrically conductive filler dispersed within the resin to provide a conductive path through the cured matrix of the adhesive.

Further, a predetermined amount of electrically conductive filler 32 may also be mixed with the resin 46 and/or the hardener 48. The addition of the electrically conductive filler 32 to the matrix of the adhesive 30 can have a strong effect on its electrical properties so long as the added filler has an electrical conductivity that is greater than the conductivity of the adhesive 30. For example, when enough electrically conductive filler has been added to a previously non-conductive pre-cured adhesive, the cured adhesive may become electrically conductive. That is, the adhesive will become electrically conductive when the content of electrically conductive filler reaches a percolation threshold, which is defined as a characteristic volume (e.g., by weight) or number or fraction of filler at which continuous electrical paths for electrical current exist in the resulting adhesive composite. These paths are the result of individual filler elements contacting one another throughout the adhesive matrix.

Any electrically conducted filler may be utilized within the adhesive 30. A non-inclusive list of such conductive fillers includes, without limitation: silver, nickel, graphite, carbon, copper and aluminum or any combination thereof. The size and shape of such filler may be selected to achieve a desired conductivity and or adhesive strength. When enough electrically conductive filler has been added to the adhesive 30, the adhesive 30 will be capable of carrying an electric current. Additionally, inclusion of a greater percentage of filler within the adhesive 30 may allow for further reduced electrical resistivity of the adhesive 30. However, while adding additional conductive filler lowers the electrical resistance of the adhesive 30, it generally also increases the viscosity of the adhesive 30 and can reduce the strength of the adhesive 30 if too great of a concentration of filler is used. Therefore, depending upon the type and electrical conductivity of the electrically conductive filler utilized, the percentage by weight of that filler may be adjusted relative to the adhesive 30 to achieve a desired resistance and/or strength.

In one present embodiment, an epoxy with aluminum filler (50% by weight) was selected for adhering the signal line 16 to the track rail 40. Tests show that resistances of signal line-to-track rail connections utilizing the electrically conductive adhesive have a resistance that is, on average, between about 10%-12% less that the resistance of a welded and crimp fit connection.

Figure 3:
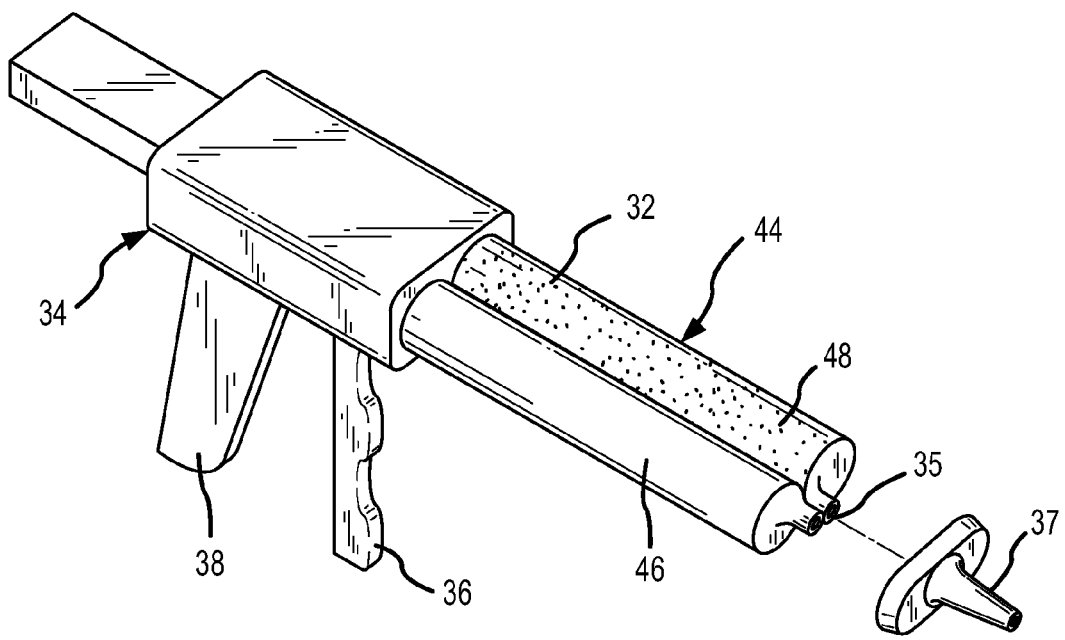
FIG. 3 shows a dual chamber container of an electrically conductive adhesive.

As will be appreciated, the epoxy is a thermosetting resin that may include two-part mixtures (e.g., a resin 46 and a hardener 48). As shown in FIG. 3 the two-part mixture is provided in pre-measured container 44 that has separate chambers for separately maintaining pre-measured quantities of the resin 46 and hardener 48. In one embodiment, these quantities may be sufficient to produce an amount of adhesive 30 that is required to form a single connection with the track rail 40. In a further embodiment, the pre-measured container 44 contains a quantity of each component that is sufficient to form a plurality of connections.

In the embodiment shown, the pre-measured container 44 is adapted to be disposed into a squeeze trigger gun or 'caulking gun' 34. By depressing the trigger 36 of the caulking gun 34 towards its handle 38, plungers in each separate chamber of the container 44 are depressed and resin 46, hardener 48 and the conductive filler 32 are expelled out of the tip 35 of the caulking gun 34. In a further embodiment, the resin 46, hardener 48 and the conductive filler 32 are expelled into a mixing tube 37 that is attachable to the tip 35 of the caulking gun 34. This tube 37 has an internal passageway that effectively mixes the resin 46, hardener 48 and the conductive filler 32 as those components pass through the tube 37. As will be appreciated use of the pre-measured container 44 and caulking gun 34 and mixing tube 37 may simplify mixing of the adhesive 30 in the field. Further, the mixing tube 37 may be removed after a desired amount of adhesive is expelled and the pre-measures container 44 may be re-capped to preserve the remaining un-mixed portions of resin 46, hardener 48 and the conductive filler 32 for later application.

As will be appreciated, to create an effective electrical connection between the signal wire 16 and the track rail 40, it may be necessary to maintain a fixed positional relationship while the electrically conductive adhesive 30 cures. The cure time will depend on one or more adhesive specific characteristics. In any case, it may be desirable to utilize a clamp/anchor to hold the signal line 16 in a fixed positional relationship with the track rail 40 as the adhesive cures and/or to protect the connection between the signal line 16 and track rail 40 after the adhesive cures.

Figure 4A:
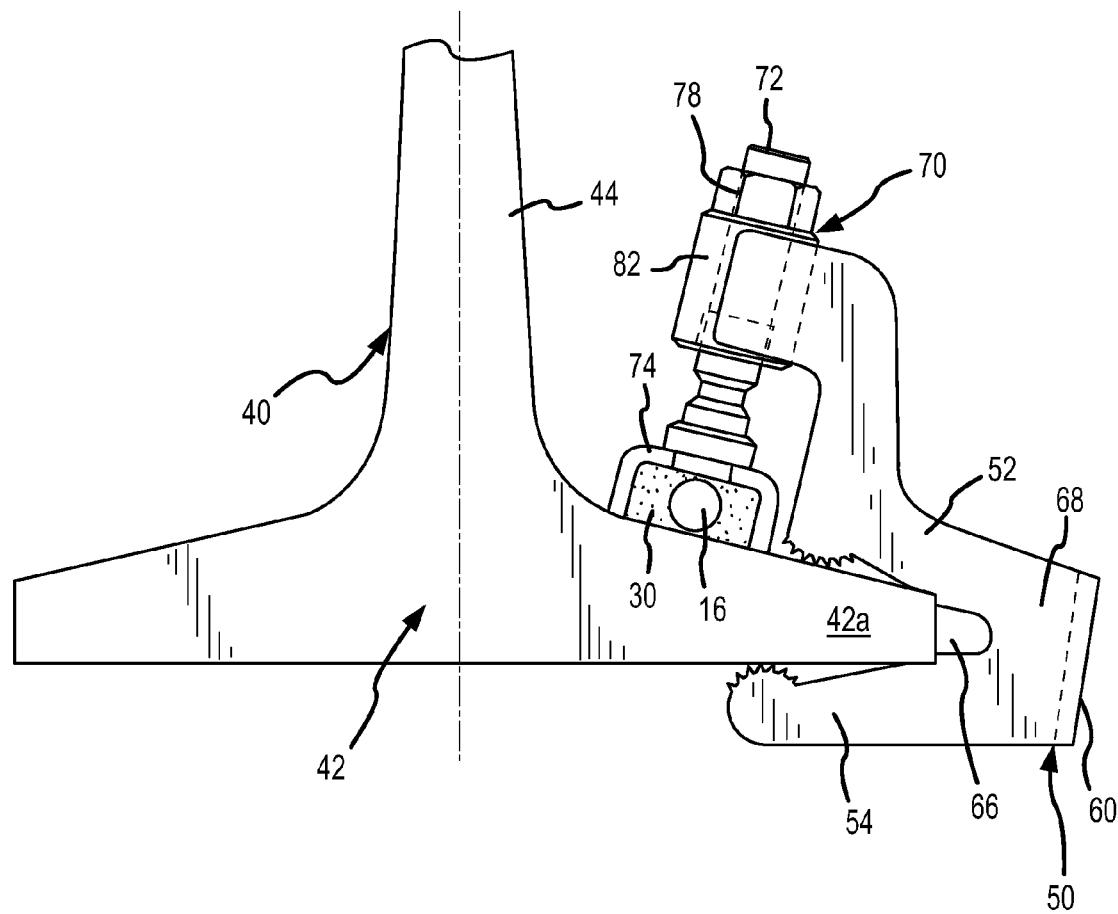
FIG. 4A shows a side view of a first clamp utilized to hold a signal conductor relative to a track rail.

FIG. 4A shows one embodiment of an anchor 50 that may be utilized to hold the signal line 16 relative to the track rail 40 while the electrically conductive adhesive cures. As shown, the anchor 50 includes opposing jaws 52, 54 for engaging top and bottom surfaces of one flange 42a of the foot 42 of the track rail 40. As shown, the opposing jaws 52, 54 define a receiving slot 66 that receives the flange portion 42a of the foot 42 of the track rail 40.

In application of the anchor 50 to the track rail 40, the flange 42a is disposed within the slot 66. An installer may then hit a strike surface 60 using, for example, a hammer to drive the flange 42a into the slot 66. Driving the flange 42a into the slot 66 spreads the jaw members 52, 54 such that a body portion 68 of the anchor 50 deforms. The body portion 68 acts as a bias force member (e.g., a spring) that, when deformed applies a compressive force between the opposing jaw members 52, 54 to maintain the anchor 50 on the track rail 40. The anchor further includes teeth 56, 58 on the opposing jaws 52, 54 that are operative to grip the surface of the track rail 40 to maintain the anchor 50 on the generally tapered flange 42a.

The anchor 50 includes a track-engaging member 70 that allows for selectively positioning a holding bracket 74 relative to a top surface of the flange 42a. This allows for securely pressing a signal line 16 against the surface of the track rail 40. The position of the holding bracket 74 is adjustable utilizing a threaded element 72 (e.g., bolt) that may be selectively threaded into an adjuster block 82 having a threaded bore. A lock nut 78 allows fixing the position of the threaded element 72 relative to the threaded block 82. As will be appreciated, the anchor 50 may be utilized to hold the signal line 16 relative to the track rail 50 while the electrically conductive adhesive 30 cures. Further, the anchor 50 may be left on the track rail 40 after the electrically conductive adhesive 30 has cured.

Figure 4B:
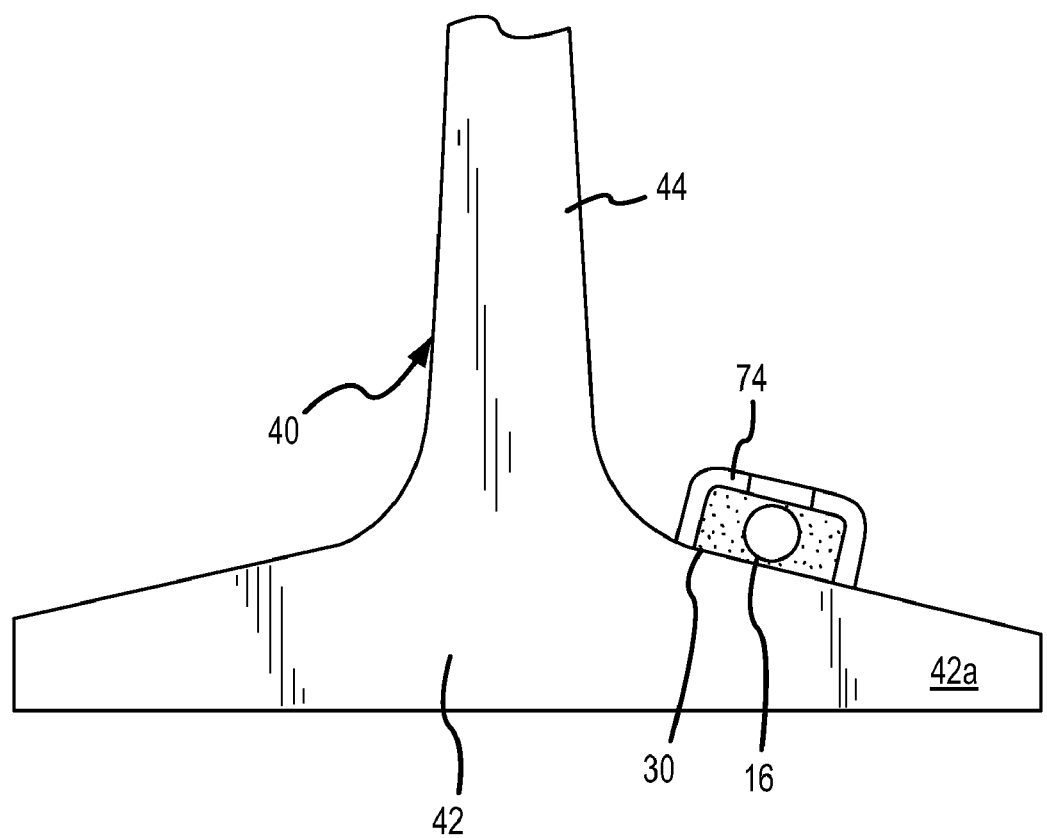
FIG. 4B shows a side view of the signal conductor of FIG. 4A attached to the track rail with the clamp removed.

To facilitate removal of the anchor 50, the holding bracket 74 may be removable from the threaded element 72. In this regard, the holding bracket 74, which may be adhered to the track rail 40 along with the signal line 16, may remain on the track rail 40 after the anchor 50 is removed. See FIG. 4B. Accordingly the anchor 50 may be re-used (i.e., with another holding bracket 74) to form other connections.

Figure 5A:
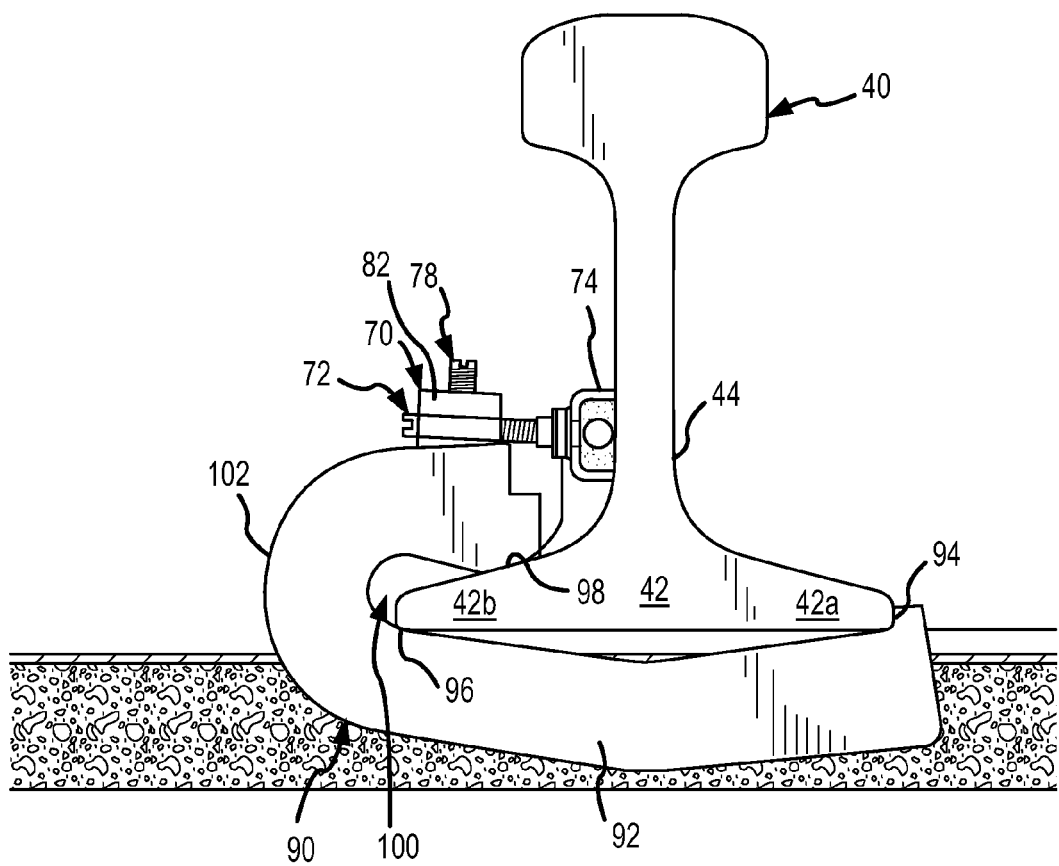
FIGS. 5A-5C shows three alternate embodiments of clamps utilized to hold a signal conductor relative to a track rail.

FIG. 5A shows another embodiment of a noninvasive anchor 90 that may be utilized to hold the signal line 16 relative to the track rail 40 while the electrically conductive adhesive cures. As shown, this noninvasive anchor 90 is a wraparound anchor that extends across the bottom of the track rail 40 to engage the both flanges 42a, 42b of the foot 42 of the track rail 40. In this regard, a body 92 of the anchor 90 includes a first flange contact surface 94, a fulcrum surface 96 and a second flange contact surface 98 for contacting a top surface of the foot 42. The wraparound anchor 90 may be applied to the track rail 40 by disposing a flange 42b into slot 100 and striking the end 102 of the anchor 90. This has the effect of driving the flange 42b into slot 100 such that the first flange contact surface 94 may extend over the end of flange 42a. When applied to the track rail 40, a compressive force is applied between the second flange contact surface 98 and the fulcrum surface 96 that maintains the anchor 90 on the rail 40. The wraparound anchor 90 also incorporates a track engaging assembly for use in holding a signal line 16 relative to the web 44 of the track rail 40. Track engaging assembly includes an adjustor block 70 having a threaded bore, a threaded adjuster 72 that is selectively positionable relative to the threaded bore, a holding bracket 74, and a set screw 78.

Figure 5B:
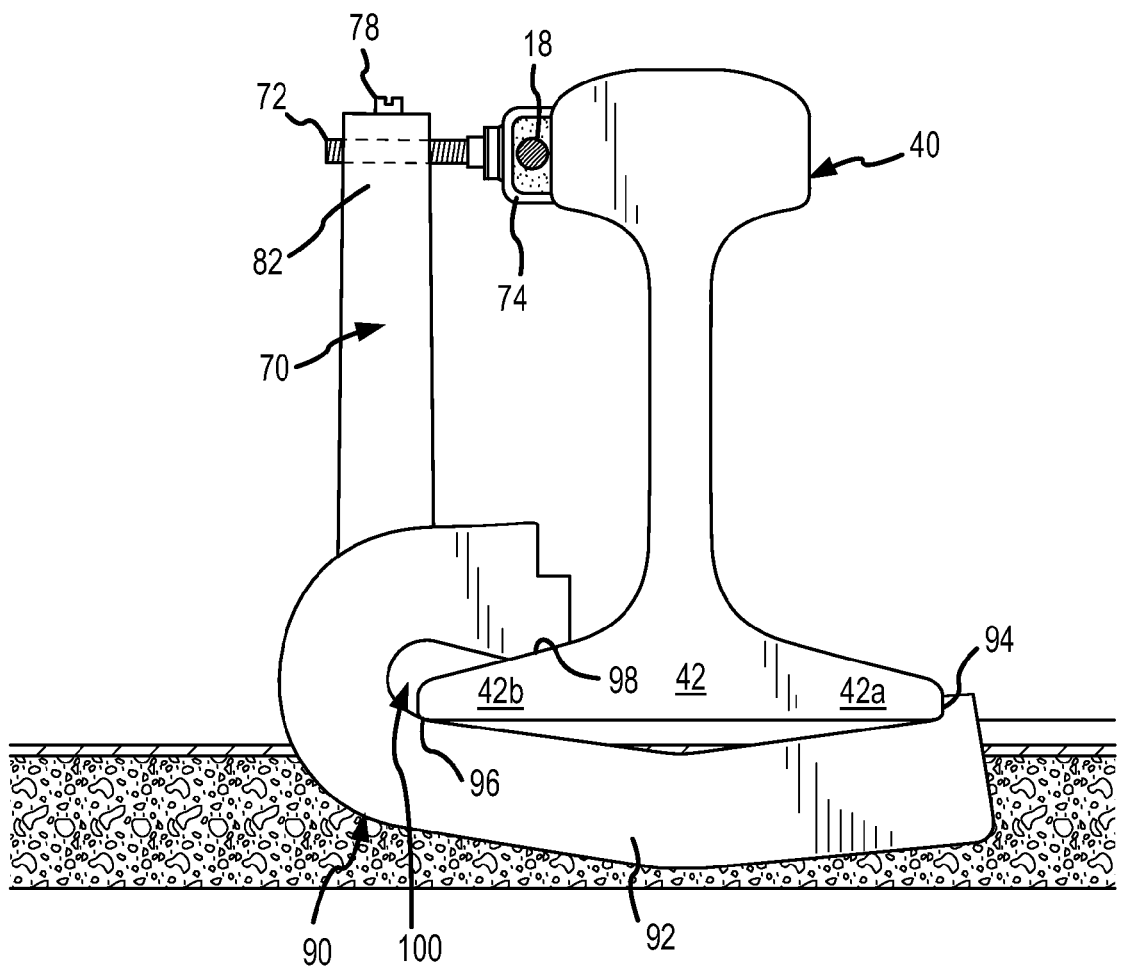

FIG. 5B shows a variation of the noninvasive anchor 90. As shown, this anchor is adapted to hold the signal line 16 against the surface of the head of the track rail 40. In this embodiment, the adjustor block 70 is elongated to permit the threaded adjustor to be positioned relative to the railhead.

Figure 5C:
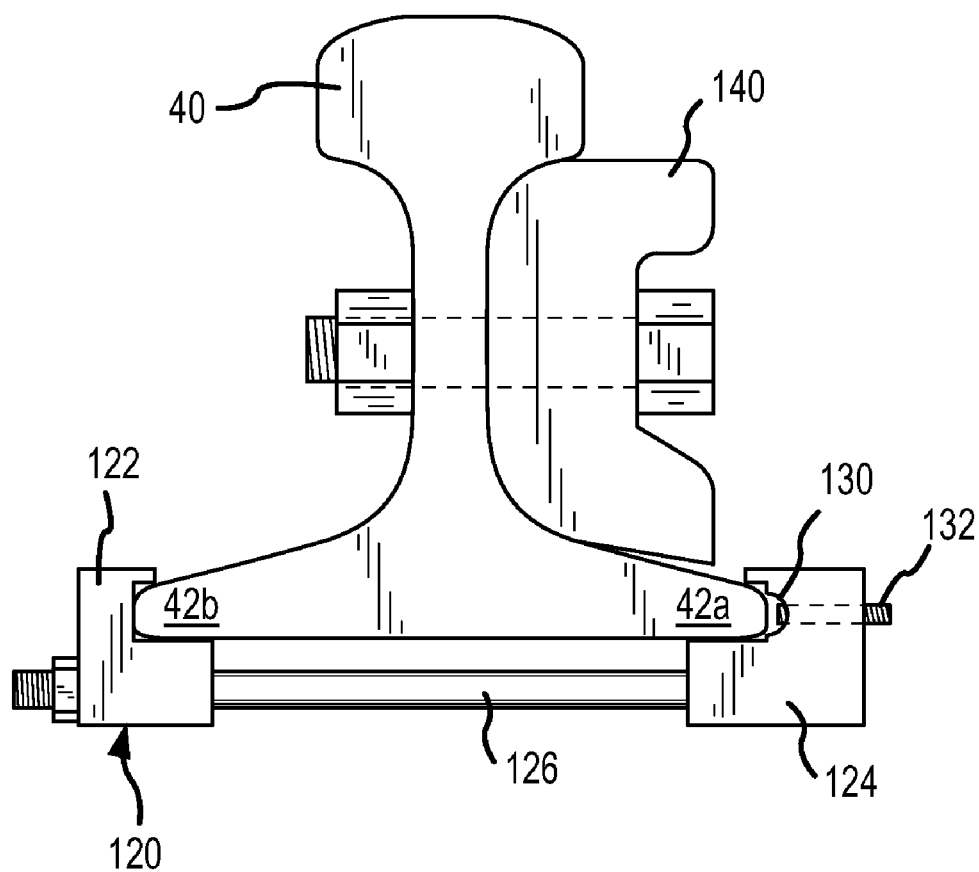

FIG. 5C illustrates a non-invasive flange anchor 120. As shown, the anchor 120 is adapted to hold a signal line relative to an edge surface of a flange 42a of the track rail 40. Such an anchor 120 may be particularly useful for attaching signal lines to track rails at track rail splices where two track rails abut. Generally, it is desirable to electrically interconnect such abutting rack rails using a signal line. However, at such locations a splice bar 140 may extend between the interface of the abutting track rails. Such splice bars 140 may be bolted to one or both sides of the web of the abutting track rails. As shown, this may prevent attaching a signal line to the track rail on the top surface of the foot and/or on the web of the track rail. Accordingly, the flange anchor provides a convenient mechanism for holding a signal line to a surface of a flange 42a such that is may be adhered thereto.

The flange anchor 120 includes first and second shackles 122, 124 and a threaded adjustor 126. As shown, the threaded adjustor is fixedly connected to shackle 124 and adjustment of a nut 128 moves shackle 122 to adjust the distance between the two shackles 122, 124. To facilitate holding a signal line (not shown) to the surface of the flange 42a, at least one of the shackles 122, 124 includes a recess 130. This recess is preferably sized to permit a signal wire to be disposed between the surface of the flange 42a and the shackle 124. Once so disposed, a threaded set screw 132 may be utilized to press the signal line against the surface of the flange 42a. As will be appreciated, an electrically conductive adhesive may be applied to the signal line and or the surface of the flange 42a in conjunction with the above steps. Further, the flange anchor may include a removable recess liner, e.g., a half cylinder, (not shown) that acts similar to the bracket 74 of FIG. 4. This may permit removal of the flange anchor 120 once a signal line has been adhered to the flange 42a.

Figure 6:
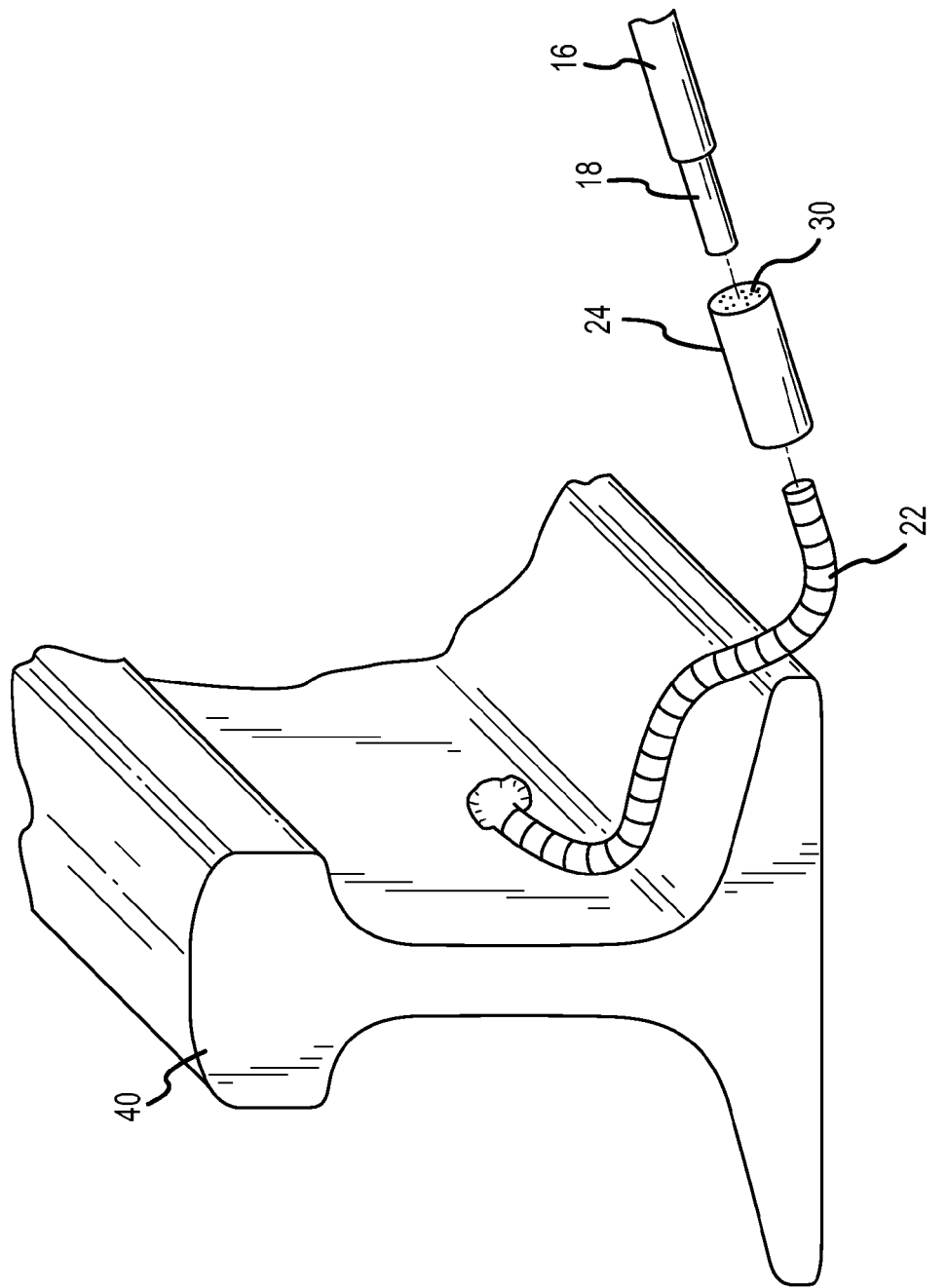
FIG. 6 illustrates an interconnecting two signal conductors with a hollow ferrule.

FIG. 6 illustrates another application of an electrically conductive adhesive for use in creating an electrical interconnection between a track rail 40 and a signal line 16. As noted above, existing connections on track rails typically utilize a short cable or 'pig tail' 22 having a first end that is welded to the track rail 40 and a second end that is crimp fit to the conductive core 18 of a signal line 16. Typically, a hollow ferrule 24 is utilized to create the crimp fit connection. Corrosion between the ferrule 24, the conductive core 18 and/or the pigtail 22 often degrades the interconnection over time. In the embodiment shown in FIG. 6, the inside of the hollow ferrule 24 is filled with conductive adhesive 30 prior to inserting the conductive core 18 of the signal line 16 and the pigtail 22 therein. Likewise, the conductive core 18 and the pigtail 22 may also be coated with conductive adhesive before insertion into the ferrule 24. The ferrule 24 may then be crimped to mechanically couple the signal line 16 and the pigtail 22. Upon curing, the conductive adhesive allows for better electrical conductivity between the signal line 24 and pigtail 22. Furthermore, the conductive adhesive reduces and/or eliminates corrosion issues such that the interconnection is less susceptible to degradation over time. In this regard, existing track rail 40 to signal line 16 connections that utilize pigtail connections can be improved.

Figure 7:
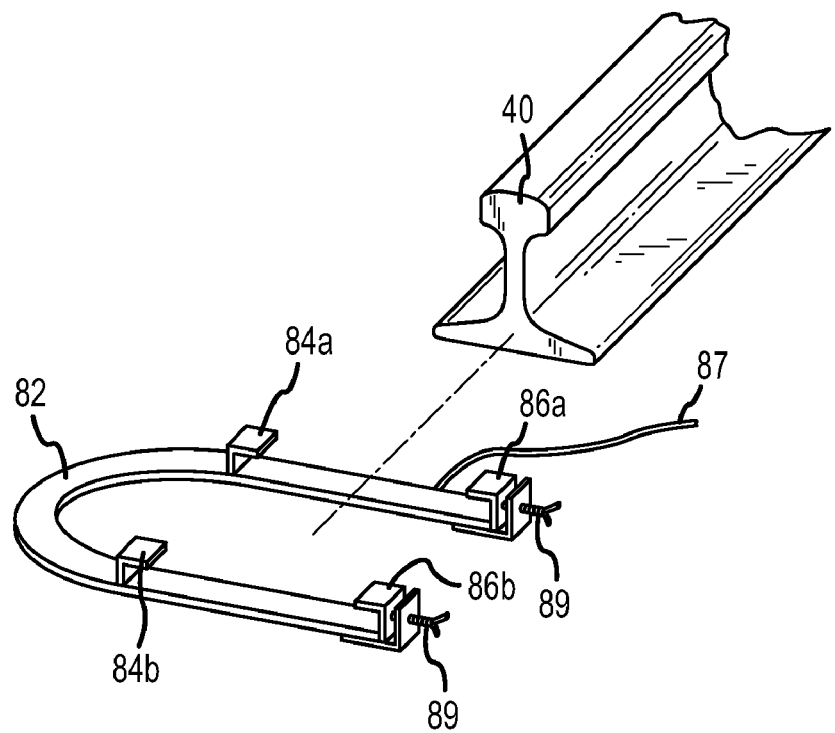
FIGS. 7 and 8 illustrate a track rail heater.
Figure 8:
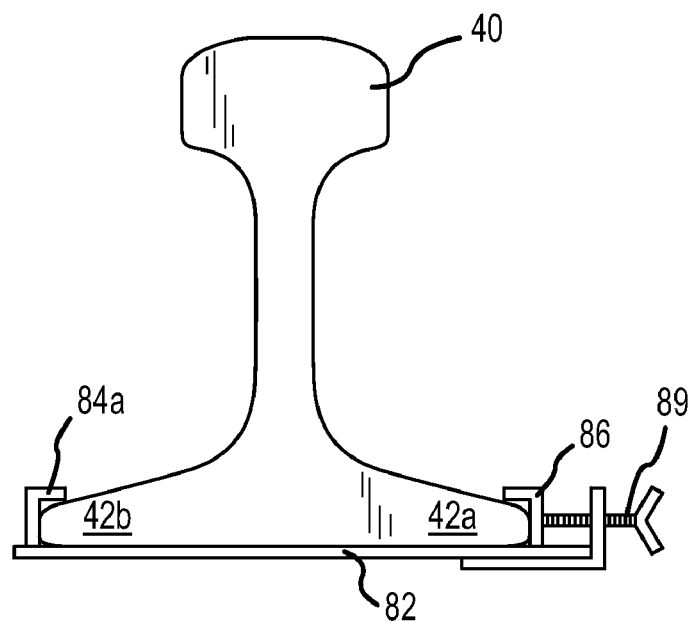

FIGS. 7 and 8 illustrate a heater assembly 80 that may be selectively applied to a portion of a track rail 40 for heating the track rail 40. As noted above, the conductive adhesive typically requires application within a predetermined temperature range. Often, a lower limit of this temperature range is at or near freezing. However, many railroads are located in areas where they are exposed to temperatures well below freezing. Accordingly, to create an adhesive connection to such a track rail 40, the track rail 40 may be heated to an acceptable temperature.

As shown FIG. 7, the heater assembly 80 includes is a substantially U-shaped heater element 82 that is adapted for application to the bottom surface of a track rail 40. A releasable clamp assembly is utilized to engage the track rail 40 and hold the heater element 82 in contact with a bottom surface of the track rail 40. The releasable clamp assembly includes two gauge side shackles 84a, 84b for engaging a gauge side flange 42b of the track rail 40 and a selectively positionable field side shackles 86a, 86b for engaging the field side flange 42a. The clamp assembly includes a threaded adjustor that permits advancement and retraction of the field side shackles 86a, 86b relative to the gauge side shackles 84a, 84b. In use, the field side shackles 86a, 86b are retracted relative to the gauge side shackles 84a, 84b such that the foot of the track rail 40 may be disposed between the opposing shackles 84, 86. Once so disposed, the field side shackles 86a, 86b are advanced until the opposing flanges 42a, 42b of the track rail 40 are compressed there between. In this position, a flat surface of the U-shaped heater element 82 is held in contact with the bottom surface of the track rail 40. An electrical connector 87 of the heater assembly 80 may then be connected to an electrical source to begin heating of the track rail 40. As will be appreciated, the heater assembly may further incorporate temperature sensors to permit the assembly 80 to maintain the heated portion of a track rail at a predetermined temperature. Of note, the heater assembly 80 is designed for attachment to the track rail 40 such that railroad vehicles may pass over the track rail 40 while the heater assembly 80 is attached. Furthermore, plastic sheeting may be draped over the heated area of the track rail 40 in wet conditions. Likewise, such plastic sheeting may remain during passage of railroad vehicles.

Once the track rail 40 has attained a predetermined temperature, the conductive adhesive may be utilized to interconnect the signal line to the track rail 40. Alternatively, the adhesive may be applied prior to heating the track rail. Preferably, the distance between the open ends of the U-shaped heater element 82 is sufficient to permit attachment of a clamp therebetween for holding a signal line 16 are relative to the track rail 40. In any case, the heater assembly 80 may remain attached the track rail 40 while the conductive adhesive cures. Furthermore, the heat from the heater assembly 80 may accelerate the cure period for the adhesive.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. A method for electrically connecting a signal line to a track rail, comprising the steps of:
   preparing a contact area on the surface of said track rail;
   applying an electrically conductive adhesive in a pre-cured state to at least one of said contact area and an electrically conductive portion of a signal line;
   contacting said electrically conductive portion of a signal line with said contact area; and
   maintaining a fixed positional relationship between said electrically conductive portion of said signal line and said contact area on said track rail while said conductive adhesive cures, wherein upon curing to a hardened state said electrically conductive adhesive electrically and mechanically connects said signal line to said track rail.

2. The method of claim 1, wherein said applying step comprises substantially encapsulating said electrically conductive portion of said signal line in said electrically conductive adhesive.

3. The method of claim 1, wherein applying said electrically conductive adhesive comprises applying an adhesive resin containing an electrically conductive filler.

4. The method of claim 3, further comprising:
   providing pre-measured amounts of said adhesive resin and said electrically conductive filler;
   mixing said adhesive resin and said electrically conductive filler to form said electrically conductive adhesive.

5. The method of claim 4 wherein providing said adhesive comprises providing first and second pre-measured amounts of a resin and a hardener, respectively, wherein said electrically conductive filler is disposed within one of said resin and said hardener.

6. The method of claim 4, wherein providing said electrically conductive filler comprises providing at least one of:
   a metallic filler; and
   a carbon-based filler.

7. The method of claim 1, wherein said maintaining step further comprises:
   clamping at least a portion of said signal line to said track rail.

8. The method of claim 7, wherein said maintaining step further comprises:
   clamping said electrically conductive portion of said signal line to said track rail.

9. The method of claim 7, further comprising:
   removing a clamp utilized to clamp said signal line to said track rail after said adhesive has cured.

10. The method of claim 1, where preparing said contact area comprises abrading the surface of said track rail.

11. A method for electrically connecting an electrical conductor to a track rail, comprising the steps of:
    providing pre-measured amounts of an adhesive and an electrically conductive filler;
    mixing said adhesive and said electrically conductive filler to form an electrically conductive adhesive;
    abrading a surface of said track rail to form a contact area;
    using said electrically conductive adhesive to adhere an electrical conductor to said contact area on said track rail.

12. The method of claim 11, further comprising:
    clamping at least a portion of said electrical conductor to said contact area on said track rail.

13. The method of claim 11, wherein said providing step comprises providing first and second pre-measured amounts of a resin and a hardener, respectively.

14. The method of claim 13, wherein providing said adhesive comprises providing an epoxy adhesive.

15. The method of claim 13, wherein said electrically conductive filler is disposed within one of said first and second pre-measured amounts of said resin and said hardener.

16. The method of claim 13, wherein providing said conductive filler comprises providing at least one of:
    a metallic filler; and
    a carbon-based filler.

17. The method of claim 11 further comprising maintaining said electrical conductor in a fixed positional relationship with said contact area while said adhesive cures.

* * * * *

UNITED STATES PATENT AND TRADEMARK OFFICE
CERTIFICATE OF CORRECTION

PATENT NO. : 7,543,372 B2
APPLICATION NO. : 11/186217
DATED : June 9, 2009
INVENTOR(S) : Reichle It is certified that error appears in the above-identified patent and that said Letters Patent is hereby corrected as shown below:

Column 3, line 26, delete "rage" and insert therefor --range--.
Column 4, line 44, delete "an/or" and insert therefor --and/or--.

Signed and Sealed this

Eighteenth Day of August, 2009

David J. Kappos
*Director of the United States Patent and Trademark Office*